United States Patent [19]

Evans

[11] Patent Number: 5,386,522
[45] Date of Patent: Jan. 31, 1995

[54] DYNAMIC PHYSICAL ADDRESS ALIASING DURING PROGRAM DEBUGGING

[75] Inventor: David H. Evans, Lexington, Ky.

[73] Assignee: International Business Machines, Corp., Armonk, N.Y.

[21] Appl. No.: 815,734

[22] Filed: Dec. 30, 1991

[51] Int. Cl.$^6$ .................. G06F 12/08; G06F 11/00; G06F 11/30

[52] U.S. Cl. .................. 395/400; 395/575; 371/16.1; 371/16.2

[58] Field of Search .............. 395/400, 575; 371/16.1, 371/16.2

[56] References Cited

U.S. PATENT DOCUMENTS

| | | | |
|---|---|---|---|
| 4,954,942 | 9/1990 | Masuda et al. | 395/575 X |
| 5,132,971 | 7/1992 | Oguma et al. | 371/16.2 |
| 5,278,961 | 1/1994 | Mueller | 395/400 |
| 5,278,962 | 1/1994 | Masuda et al. | 395/400 |
| 5,295,260 | 3/1994 | Pribnow | 395/575 |

OTHER PUBLICATIONS

Kernel Debugger Manual, Sep. 8, 1989.
IBM Application/System Debug Tool (ASDT32) User's Guide and Reference Version 0.9 Feb., 1992.

*Primary Examiner*—Jack B. Harvey
*Assistant Examiner*—Michael A. Whitfield
*Attorney, Agent, or Firm*—Laurence R. Letson; William B. Porter; William A. Kinnaman, Jr.

[57] ABSTRACT

The physical memory of a computer may not be directly accessable to the operator during the operation of a program due to the operational requirements of the operating system. Direct access to the physical memory of the computer during such operation may be possible through the aliasing of the physical memory locations and the creation of virtual alias addresses which will then give operator the necessary control to directly access any memory location thereby permitting the debugging of the program.

3 Claims, 3 Drawing Sheets

DYNAMIC PHYSICAL ADDRESS ALIASING DURING PROGRAM DEBUGGING

TECHNICAL FIELD OF THE INVENTION

The present invention relates to software or computer program debugging systems and a method of providing alias addresses for the physical memory of a system for purposes of inspecting and altering, if necessary, the contents of physical address locations.

BACKGROUND OF THE INVENTION

Debuggers or debugging computer programs are used by computer programmers to methodically work their way through or into specific regions of a particular program that has been written. The programmers are then able to make alterations and corrections so that the program will operate and function properly without either giving erroneous results or becoming locked up such that it cannot continue.

Debugging programs, commonly referred to as debuggers, can, in effect, override normal operation and operational controls of a program so that the operator may look into or get into a program or the storage locations in which the program is stored. This allows the programmer to control the step-by-step operation of the program being debugged and also allows the programmer to inspect the contents of any particular memory location in physical memory to ensure that the proper values are stored in that location as well as giving the programmer direct access to that location to make alterations or corrections. Using a debugger, a programmer may get into the inner workings of an operating system, an application program or device driver programs. Device driver programs which interface between the application program and an input/output device, such as a printer, disk file or other device which provides signals to the program and receives signals and commands from the program controlled processor to perform some function.

There exists more than one kind of debugger program. Once such type is a kernel level debugger. This type of debugger is embedded into the operating system with which it functions and allows the programmer access to the operating system and higher level programs, such as application programs or device driver programs, that are running with the operating system.

A second type of program for debugging is a separate stand-alone debugging program or debugger such as the present invention and allows the debugging of computer programs without having to load the kernel level spin of the operating system. This is desirable because bugs found in programming on what may be referred to as the retail level of the operating system (the level ultimately delivered to the customer) may be permuted or be masked when running on the kernel level spin of the operating system. This may be due to the fact that when the debugger portion of the kernel level spin is added, there are sufficient changes made in the program environment to cause the base program no longer to reflect its operation as it exists in the retail level.

Where the debugger program is not embedded in the operating system, any bugs in the program being debugged or any problems with that program are more readily identifiable and correctable because it is running in its natural environment, the retail spin or level of the operating system.

Kernel level debuggers integrated into the operating system program have built in hooks or interrupt intercepts to allow the computer programmer to monitor events as a program operates.

Summary of the Invention

It is an object of the invention to provide access for the programmer to the physical memory locations so the programmer can read and correct physical memory data during the debugging analysis.

When the programmer is working on a program which is intended to run on an Intel 80386 microprocessor, for example, the programmer and the system developer are confronted with three types of addresses: virtual, linear and physical. The debugging program must provide a method by which the developer can view and alter dynamically the memory contents that are at any given physical address. By dynamically, it is understood that the programmer must be able to view and alter the memory at any given physical address as the programmer is working in the program and as the program is loaded and operating.

While this technique may be applicable to any programmer and any program which presents similar debugging problems, the preferred environment and the preferred program under which the debugger operates is the IBM OS/2 Version 2.0 program for use on Intel 80386 microprocessors.

Most device drivers that are written for use with the OS/2 program use a DevHelp PhysToVirt call to dynamically read or write to a physical address. Unfortunately, the debugging tool or program is only able to use the DevHelp functions during the initialization phase. This is the case because the debugging program receives interrupts directly via the Interrupt Descriptor Table (IDT) during post initialization operation, placing it in an unknown state for the DevHelp calls.

An alternative course that device drivers have to access physical memory is to create a global descriptor table (GDT) selector that has permanent access to a given range of physical memory. This is done by two DevHelp calls: AllocGDTSelector and PhysToGDTSel. These two calls can give the device driver access to physical memory within a particular zone or given range, but the physical memory is not completely accessible since only a zone or range of the physical memory is directly accessible at any time.

In general, a device driver requests a GDT Selector to map permanently, a specific physical address for only a small area, for example, the video buffer. This is the case because the overhead requirements in the system to accomplish this direct mapping for a large physical buffer are unacceptable. For example, to map permanently a four megabyte block of physical memory requires sixty-four GDT Selectors, one Page Directory Entry (PDE) and one Page Table (PT), mapping of a sixteen megabyte physical memory supported by the IBM PS/2 computer line would therefore deprive the system of over three percent of its GDT Selectors and 16K of physical memory. Mapping of the full four gigabyte physical address space supported by an 80386 Intel microprocessor would be impossible. The method employed by this debugging program requires only a single GDT Selector and only four bytes of additional physical memory. This method allows the debugger to refer to and access any physical address whatsoever.

Figure 1:
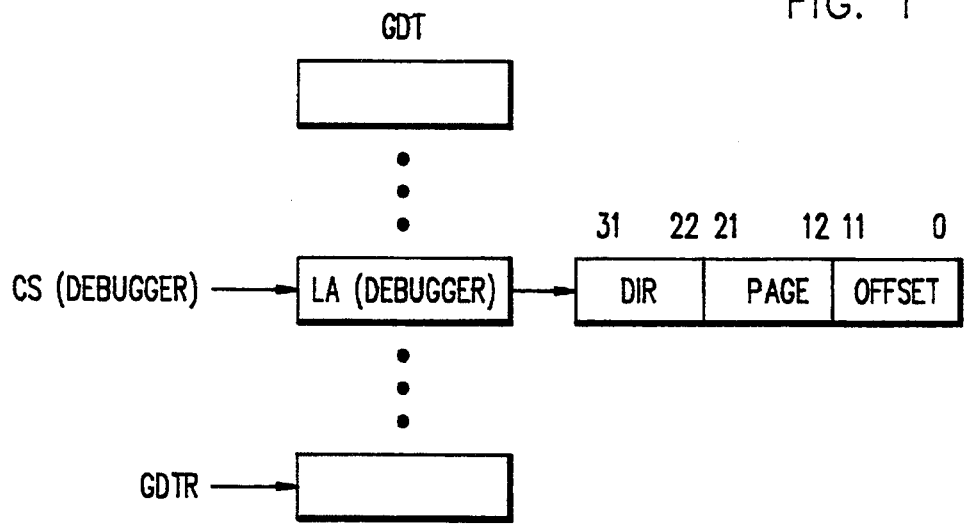
FIG. 1 is a diagrammatic representation of the Global Descriptor Table and a representation of the contents of one entry in the Global Descriptor Table.

Referring to the drawings, a better understanding of the invention may be had from the detailed description of the invention to follow.

DETAILED DESCRIPTION OF THE BEST MODE FOR CARRYING OUT THE PREFERRED EMBODIMENT OF THE INVENTION

The debugger program can find its own permanent linear address which is the starting point for the debugging program as stored in memory using what is known as a Code Segment (CS) as an index for entry into the Global Descriptor Table of FIG. 1.

Once the code segment is used to enter the Global Descriptor Table (GDT), the GDT will then yield a thirty-two bit linear address which is stored at the location in the GDT corresponding to the code segment. This thirty-two bit linear address is the starting point for the debugger program.

The thirty-two bit linear address, as can be seen in FIG. 1, is comprised of three segments. One is the segment labeled DIR, a second labeled PAGE and the third labeled OFFSET. DIR represents an index into the page directory and the value designated PAGE represents an index into a Page Table while offset is the number of sequential storage locations or bytes from the beginning of the page of the physical address which then indicates the precise location of the debug program in physical memory.

The DIR or directory segment of the linear address designating the debugger program, occupying the high-order ten bits of the linear address, forms an index into the current Page Directory (PD). Hence, the debugging program finds the physical address (PA) of the Page Directory and adds in the ten bit index (which has been multiplied by four to compensate for the length of each Page Directory Entry) to form the physical address of the Page Directory entry that maps to or designates the debug program.

Figure 2:
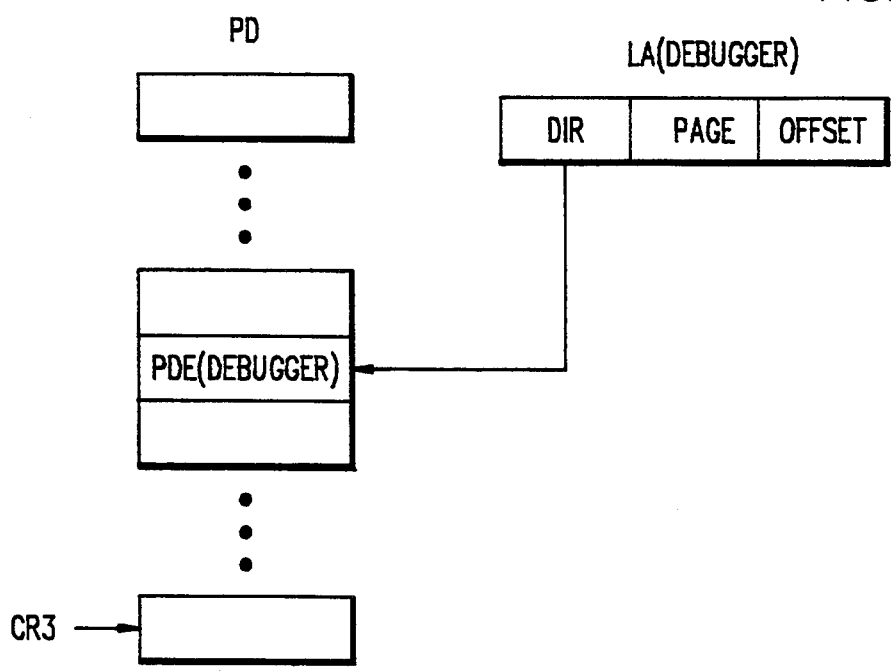
FIG. 2 is a representation of a Page Directory and a representation of the contents of one location in the Page Directory.

This is more clearly represented in FIG. 2 where the Page Directory is illustrated having a Page Directory Entry (PDE) for the debugger. The Page Directory Entry has the physical address of the Page Table that maps the debugger program.

After the physical address has been determined from the Page Directory Entry in the Page Directory, the debug program then obtains a short term alias for this physical address by use of the DevHelp PhysToVirt call. This short term alias is typically stored in register pairs ES:DI of the 80386 Intel microprocessor. With the short term alias having been created, the debug program has a virtual address which is the equivalent of the physical address for the Page Directory Entry. The debug program reads the Page Directory Entry using this virtual address thereby gleaning the physical frame of the Page Table that maps the debugger program.

Figure 3:
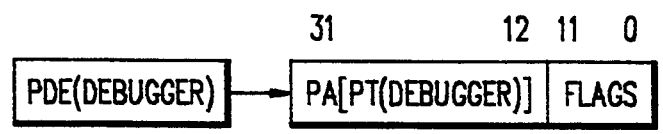
FIG. 3 is a representation of the physical address of the Page Table that maps the debug program.

Since we now have a virtual address, the Page Directory Entry contents may be read since the operating system cannot work directly with a Physical Address but is capable of working with a virtual address. The virtual address enables reading the Page Directory Entry that defines the Physical Address of the Page Table which defines in turn the location of the start point of the debug program and takes the form of that shown in FIG. 3. The top or highest order twenty bits in the physical address of the Page Table defines the starting point of the debug program; the lower twelve bits are flags which will be discussed later.

The Page Directory Entry (PDE) which defines the start point of the debug program is constant since the debug program as a device driver itself is in a constant or fixed location in physical memory. Because the Page Directory Entry (PDE) defining the start point remains constant, the DIR portion of the linear address for the debugger program will likewise remain constant.

Figure 4:
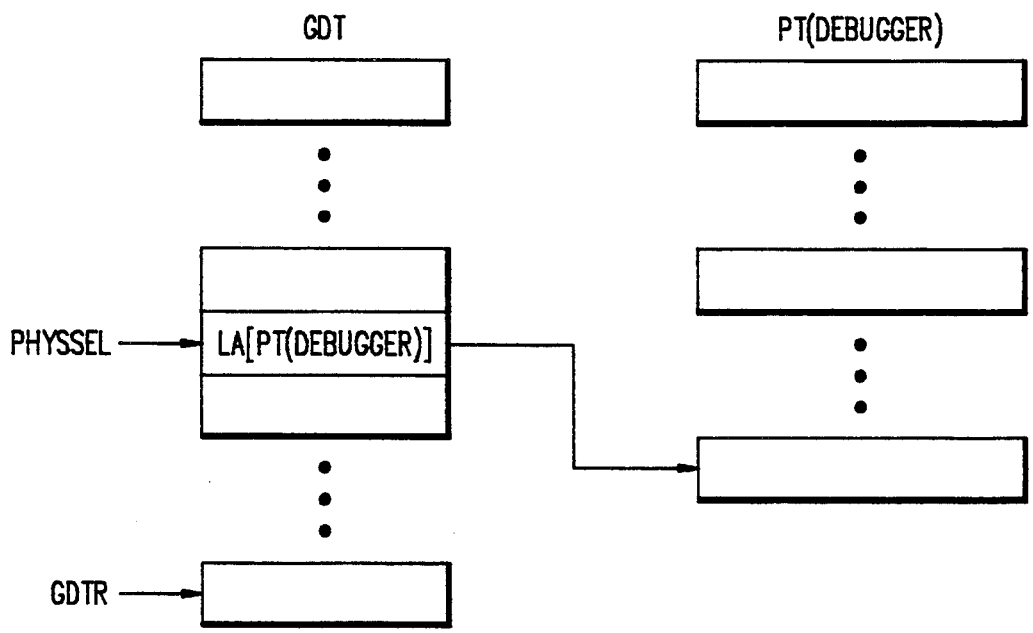
FIG. 4 is a representation of the Global Descriptor Table and the Page Table with a correlation between the two.
Figure 5:
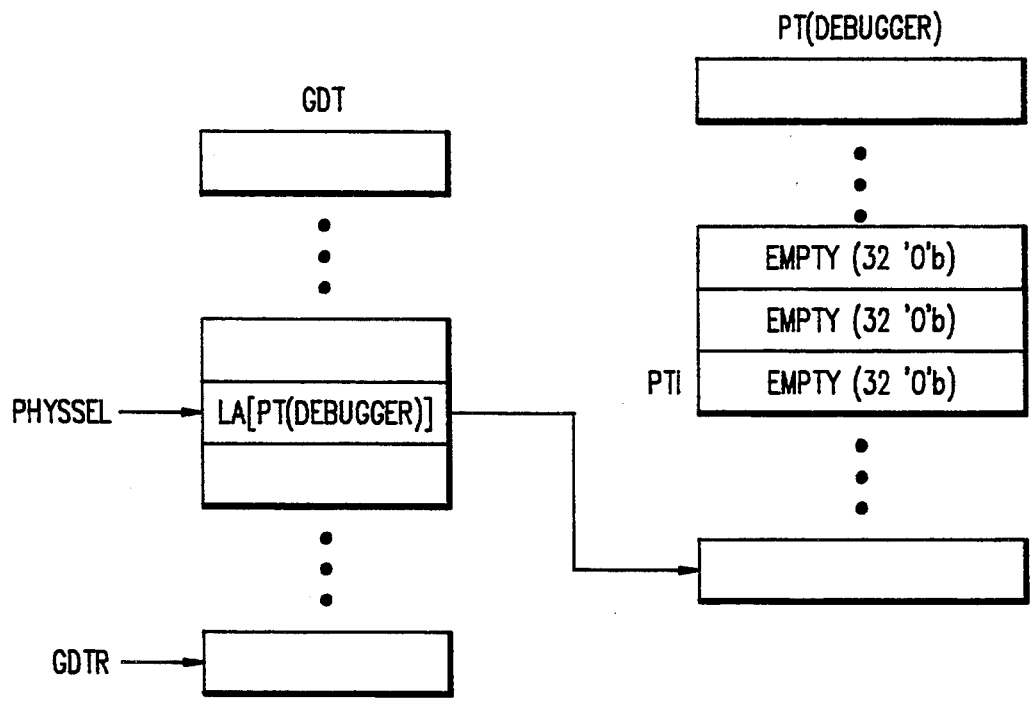
FIG. 5 is a representation of the Global Descriptor Table and Page Table as it is operated on by the debug program.

With reference to FIG. 4, the debug program uses the DevHelp PhysToGDTSel call to associate the Physical Address (PA) for the Page Table which defines the debug program starting point with a selector in the Global Descriptor Table (GDT) that was allocated previously as PHYSSEL from this point. PHYSSEL can then be used since it is a virtual address, to dynamically access the Page Table that maps the debugger program.

PHYSSEL is a virtual address selector that is used for entering the Global Descriptor Table (GDT) at the point where the linear address for the Page Table defining the debug program is stored. The use of the virtual address PHYSSEL permits going directly to the Page Table which defines the debug program since the virtual address of PHYSSEL is usable by the operating system.

The foregoing steps constitute a set-up or conditioning which is accomplished to permit dynamic accessing of physical memory locations or physical addresses at any time and not just during the period of initialization as has heretofore been a serious problem.

When the debugger program is entered by an interrupt and the user or the programmer desires to read or write a particular physical address, and more specifically a particular physical memory location, the debugger program searches the Page Table (PT) defining the debugger program as accessed through PHYSSEL to locate three contiguous four-byte segments of memory (three contiguous Page Table entries) which are empty. The index of the first of the three PTEs is designated Page Table Index (PTI) for reference.

Figure 6:
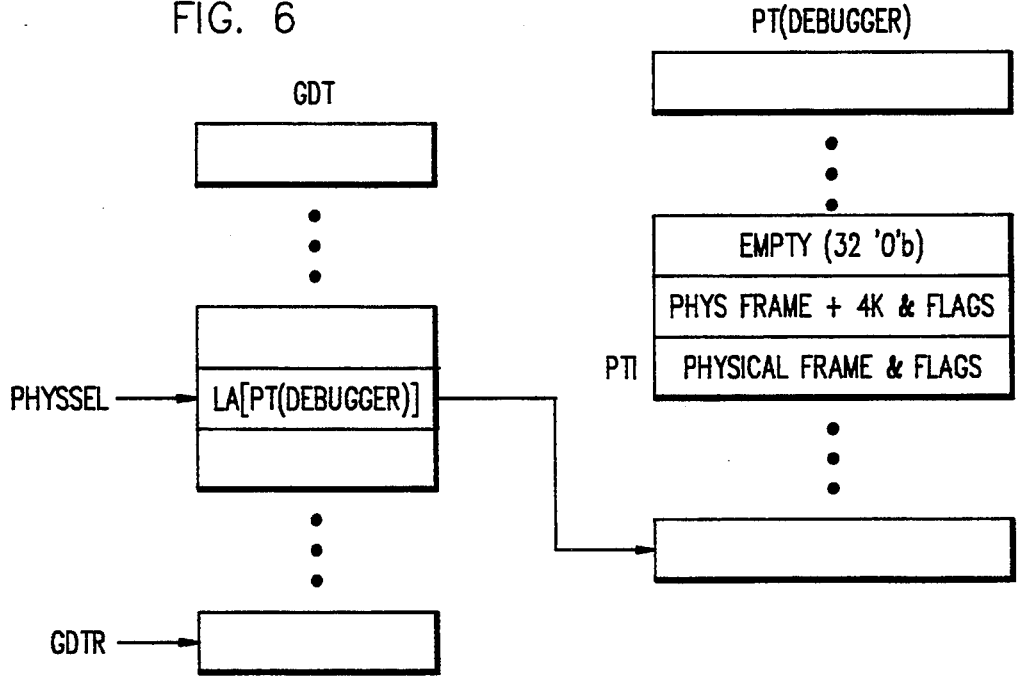
FIG. 6 is a representation of the Global Descriptor Table and the Page Table showing contents of selected Page Table locations.

Once the three consecutive, unused Page Table Entries are found, the physical frame portion of the four-bytes at the Page Table Index (PTI), is manipulated as shown in FIG. 6, so that the physical frame designation is the same as the physical frame for the frame which contains the memory location which the programmer is interested in accessing for purposes of either reading from or writing to that location. The next adjacent four byte location is then modified so that the physical frame designation is the physical frame designation previously stored in the earlier PTE but increased by 4K so that in effect there is now designated an 8K block of memory location into which the program may reach and retrieve from the designated memory locations.

The last entry of the three contiguous four byte segments is left empty or as thirty-two bits of zeros as illustrated in FIG. 6 in order to act as a guard page.

After the two Page Table Entries or PTEs have been altered to reflect the physical memory frame designators, then the status flags are changed to reflect an accessed, present, user/supervisor, and read/write state. This conventional restructuring of the flags permits the operator to do certain things such as permit the debugger to read and write or modify the contents of those specific memory locations. After the flags have been altered or reset, the page translation cache of the microprocessor is flushed so that it no longer contains outdated information and the next time that cache is accessed, it will load and acquire current address status flag information.

Figure 7:
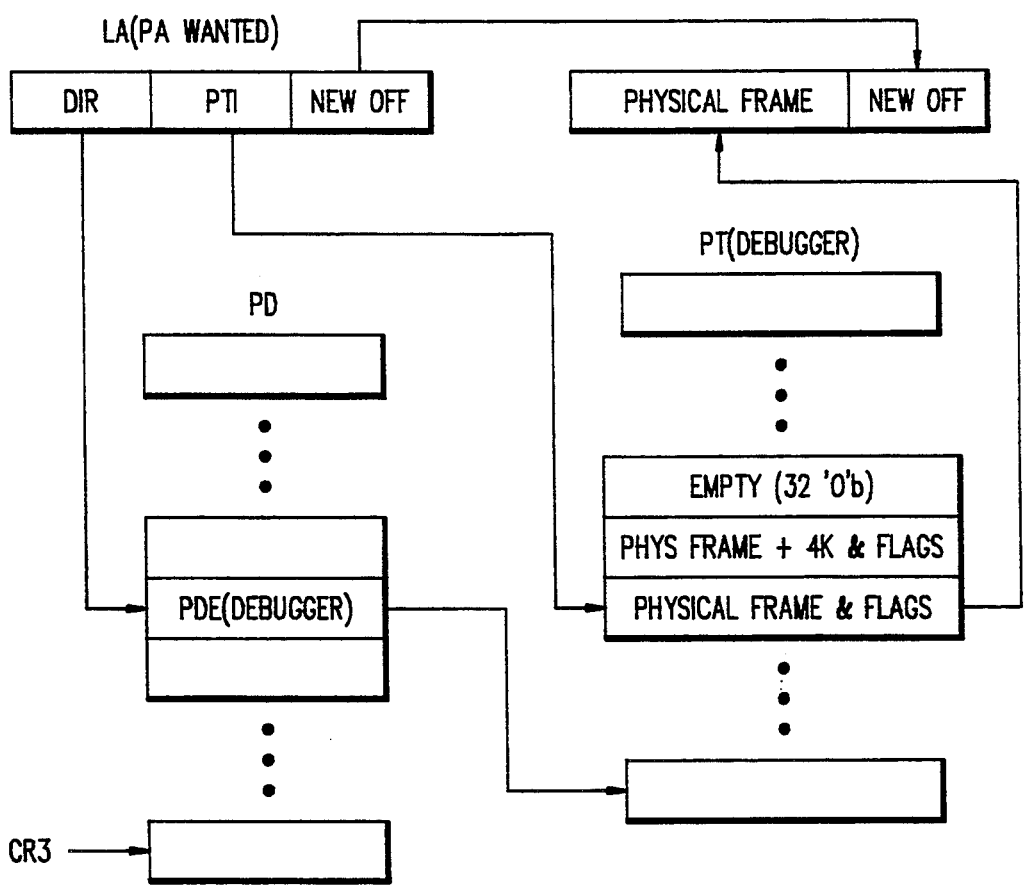
FIG. 7 is a representation of the linear addresses and how portions of the linear address are used to access segments of the page directory and the page table.

A linear address which will map to the series of Page Table Entries or PTEs is constructed as shown in FIG. 7, by using the higher order ten bits of the debugger program's permanent linear address since that segment previously designated DIR is always capable of determining the debugger program's Page Directory Entry and the middle order ten bits are previously determined by virtue of the fact that it was discovered what value they must possess in order to correlate to the three four-byte contiguous segments of the memory which are then modified to act as Page Table Entries in FIG. 6.

The final twelve bits are the offset which, whether it be a linear address or a physical address, remain constant and are unchanged. Accordingly, when combined with the physical frame, the offset yields the physical address.

Thus it can be seen by using a DIR and a PTI and an offset, a linear address can be generated that accesses the physical address desired once the debugger program Page Table Entries have been modified.

This aliasing of the addresses permits the operator or programmer to access and display or change the contents of physical memory locations while the program is running. The accessing of the locations while the program is running is a dynamic accessing permitting the programmer to make desired and necessary modifications in the program being debugged at all times of operation and not just during the initialization phase.

This ability to access the physical addresses and to retrieve and act on the contents eliminates the need to attempt to make changes in the program and then rerun the program independently to verify the corrections.

While this invention has been described with respect to a specific operating system, the concept thereof is applicable to other operating systems and accordingly changes and modifications necessary to implement the invention using other programs will still remain within the scope of the invention as defined by the claims below.

I claim:

1. A method of converting a physical address of a portion of a program to be debugged, stored in a memory device of an information storage location to a linear address corresponding to said physical address, said physical address comprising a physical address frame and an offset value, said method comprising the steps of:
   a) providing a debugger program stored in physical memory;
   b) providing a program to be debugged stored in said physical memory;
   c) determining a permanent linear address of said debugger program;
   d) excerpting a portion of said permanent linear address of said debugger program to determine an index to a Page Directory Entry that maps said debugger program;
   e) said debugger program reading said Page Directory Entry to acquire a physical address of a Page Table which in turn maps the debugger program;
   f) creating a Global Descriptor Table Entry which accesses said Page Table;
   g) searching said Page Table for three unused Page Table Entries;
   h) modifying two of said three unused Page Table Entries to map any portion of said program to be debugged;
   i) converting said physical address of said information storage location of said program to be debugged by assembling a linear address comprising said Page Directory Entry index and an index of the first of said three Page Table Entries; and
   j) said debugger program accessing said information storage location using said linear address and using contents of said information storage location for display purposes or for modifying said contents of said information storage location.

2. The method of claim 1 wherein said three unused Page Table Entries are contiguous.

3. The method of claim 2 wherein said modifying step modifies the first two of said three unused Page Table Entries.

* * * * *